United States Patent
Lee

(10) Patent No.: US 8,144,157 B2
(45) Date of Patent: Mar. 27, 2012

(54) METHOD FOR PROCESSING FONT DATA IN EMBEDDED SYSTEM

(75) Inventor: Ying Chun Lee, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 793 days.

(21) Appl. No.: 12/208,850

(22) Filed: Sep. 11, 2008

(65) Prior Publication Data

US 2009/0096795 A1 Apr. 16, 2009

(30) Foreign Application Priority Data

Oct. 15, 2007 (TW) .............................. 96138404 A

(51) Int. Cl.
*G06F 15/00* (2006.01)

(52) U.S. Cl. ...................................... 345/501; 348/571

(58) Field of Classification Search ........................ None
See application file for complete search history.

(56) References Cited

U.S. PATENT DOCUMENTS

| | | |
|---|---|---|
| 2005/0146528 A1 | 7/2005 | Kotiranta |
| 2006/0232587 A1 | 10/2006 | Oh |
| 2008/0122864 A1* | 5/2008 | Utsunomiya et al. ......... 345/619 |

OTHER PUBLICATIONS

Wade Walker, Harvey G. Gragon, "Interrupt Processing in Concurrent Processors", Computer, vol. 28, Issue 6, Jun. 1995, p. 36-46.*
Taiwan Intellectual Property Office, "Office Action", May 26, 2011, Taiwan.

* cited by examiner

*Primary Examiner* — Kee M Tung
*Assistant Examiner* — Weiming He
(74) *Attorney, Agent, or Firm* — WPAT., P.C.; Justin King

(57) ABSTRACT

A method for processing font data is used in an embedded system exhibiting a display function. The embedded system includes a first processor, a second processor, a non-volatile memory and a volatile memory. The method for processing font data includes steps of: issuing a request by the first processor; converting vector-based font data stored in the non-volatile memory into bit-based font data by the second processor wherein the bit-based font data are stored in the volatile memory, and generating a finish notice by the second processor after the vector-based font data are converted into the bit-based font data; and activating the on screen display function of the embedded system responding to the finish notice by the first processor.

12 Claims, 4 Drawing Sheets

METHOD FOR PROCESSING FONT DATA IN EMBEDDED SYSTEM

FIELD OF THE INVENTION

The present invention relates to a method for processing font data, and more particularly to a method for processing font data in an embedded system.

BACKGROUND OF THE INVENTION

FIG. 1 is a functional block diagram of a prior art digital television set. The tuner 102 receives television signals generated by the television signal source 101. The television signals processed by the demodulator 103, demultiplexer 104 and then sent to the Digital Signal Processor (DSP) 111, the image decoder 112 and data decoder 113 for further processing and decoding by the Digital Signal Processor (DSP) 111, the image decoder 112 and data decoder 113. The decoded sound data is played on the speakers 131 and the image data is further processed by the graphics processor 121 and displayed on the display 132.

The received television signal is also decoded by the data decoder to be further processed by the central processing unit (CPU) 122. Commands by users via a user interface 140, e.g. a remote control 141 or panel buttons 142 on a digital television are also processed by CPU 122 then stored in the DRAM 151. A flash memory 152 stores programs and associated in generation.

On Screen Display (OSD) provides real-time operating information on screen when user switches channels, tuning up volume and adjusting display properties. The operating information, including special fonts and icons, is displayed on any specific locations on the television screen. To realize the OSD, large amount of font and data or icons need to be stored in the flash memory 152. The CPU 122 controls the font, data and icons. The CPU 122 transfers the font, data and icons to DRAM 151 for graphics processor 121.

For example, in the case of font, font files with various sizes are required to support the OSD function, which consumes large storage space of the flash memory 152. Along with the development of large size panel display and high image display resolution, bitmap font files require large storage space of the flash memory 152. Consequently, the product cost is increased. Therefore, it is a primary goal of the present invention to support high quality font display at low cost.

SUMMARY OF THE INVENTION

Therefore, the present invention discloses a method for processing font data for an embedded system having on screen display function.

The present invention provides a method for processing font data for an embedded system having on screen display function. The method for processing font data is used in an embedded system exhibiting a display function. The embedded system includes a first processor, a second processor, a non-volatile memory and a volatile memory. The method for processing font data includes steps of: issuing a request to generate font data by the first processor; converting vector-based font data stored in the non-volatile memory into bit-based font data by the second processor wherein the bit-based font data are stored in the volatile memory, and generating a finish notice by the second processor after the vector-based font data are converted into the bit-based font data; and activating the on screen display function of the embedded system responding to the finish notice by the first processor.

The present invention further provides a method for processing font data for an embedded system having on screen display function. The embedded system comprises a first processor, a second processor, a non-volatile memory and a volatile memory. The method for processing font data comprises: issuing a request to load vector font data by the first processor; in responding to the request to load vector font data, retrieving a vector-based font file from the non-volatile memory and storing the vector-based font file in the volatile memory by the second processor; issuing a request to display text then resuming other computing tasks by the first processor; and generating bit-based font data in response to the request to display text by computing on the vector-based font file by said second processor for text displaying.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

In order to provide font data for OSD without deteriorating the resolution of the display image and increasing the product hardware cost, bitmap font files are not adopted in the flash memory. According to a preferred embodiment of the present invention, vector font generation is implemented to support various sizes of font data required in on screen display function (OSD). The vector font generation records vector font files, which comprises vectors and Bezier Curve in the flash memory to resize vector fonts for OSD. The vector font generation method significantly saves the flash memory storage previously required in the prior art. Complicated computing is required to generate bitmap fonts from vector font files for display, so hardware resource is occupied during the system startup, which poses a challenge for current embedded systems having limited computing capability, e.g. a television set or a mobile phone with low cost. Accordingly, system startup time is increased. It is a primary goal of the following preferred embodiment of the device and method used in an embedded system for optimized utilization of hardware resource to speed up system startup to support OSD with vector font files under limited computing power.

Figure 1:
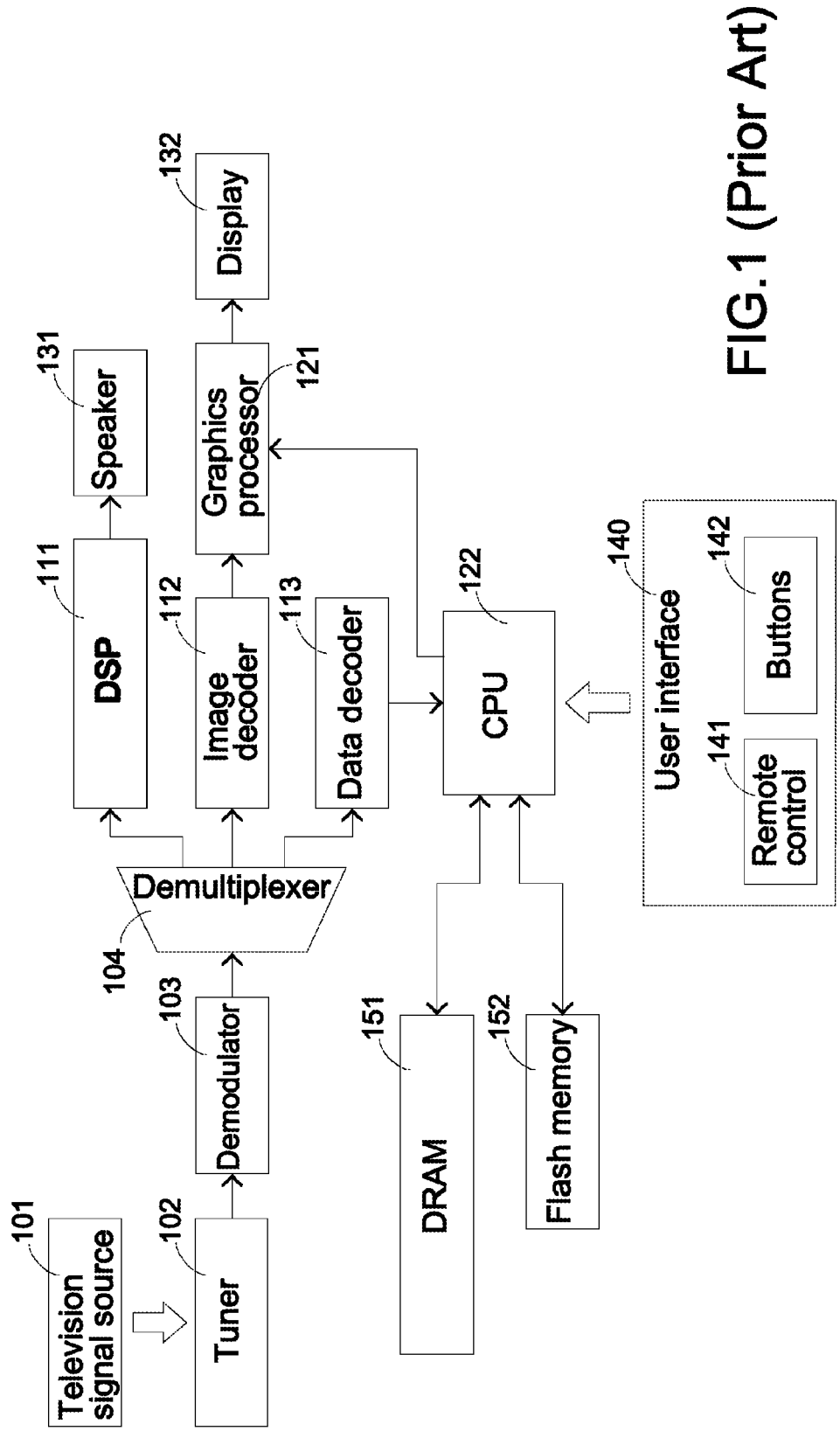
FIG. 1 is a functional block diagram of a digital television set in the prior.
Figure 2:
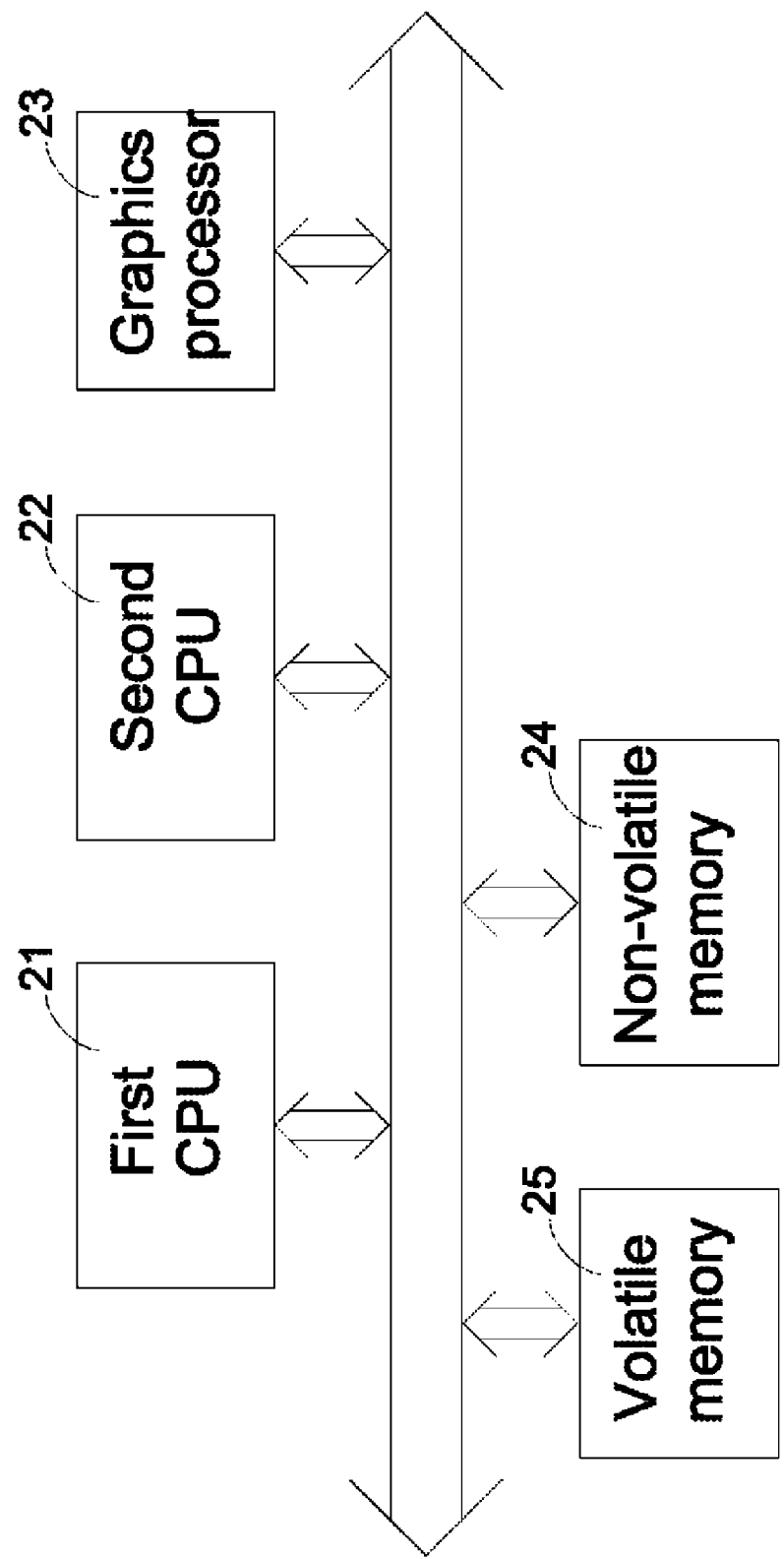
FIG. 2 is a functional block diagram according to a preferred embodiment of the present invention.

FIG. 2 is an embedded system according to an embodiment of the present invention. The embedded system comprises a first CPU 21, a second CPU 22, a graphics processor 23, a non-volatile memory 24 and a volatile memory 25. For television applications, the first CPU 21 can be an 8051 micro controller and the second CPU 22 can be a RISC (reduced instruction set computer) CPU.

Figure 3:
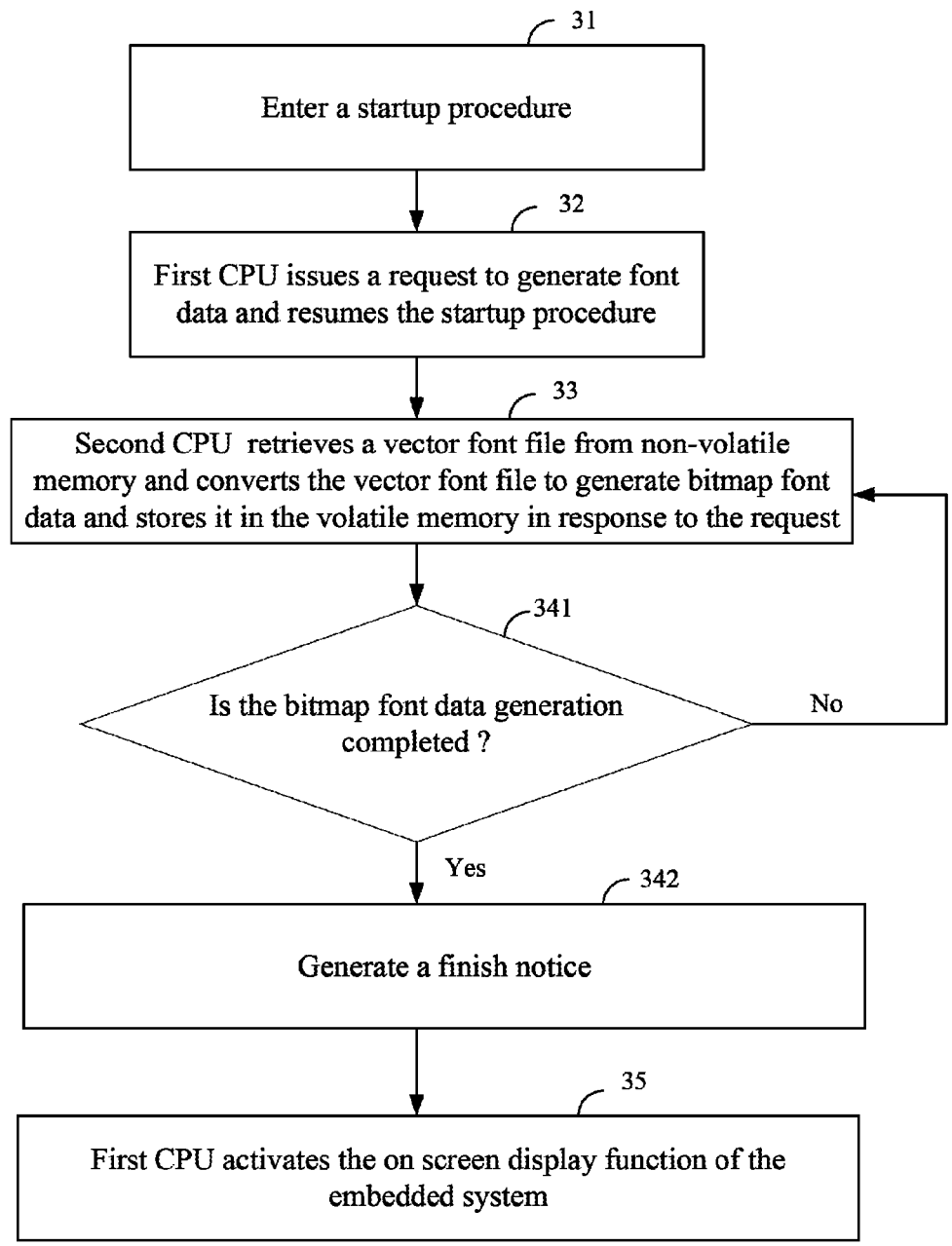
FIG. 3 is a flow chart of the method according to a preferred embodiment of the present invention.

FIG. 3 is a flow chart of a font data processing method according to a preferred embodiment of the present invention. With reference to the hardware in the FIG. 2, firstly, the system enters a startup procedure at step 31. Then the first CPU 21 issues a request to generate font data and resumes the startup procedure at step 32. In response to the request to generate font data, the second CPU 22 retrieves a vector font file from non-volatile memory 24 then converts the vector font file to bitmap font data and stores the bitmap font data in the volatile memory 25 at step 33. Entering steps 341 and 342, determine if the bitmap font data generation is completed and generate a finish notice if the generation is completed. Lastly at step 35, in response to the finish notice, the first CPU 21 activates the on screen display function of the embedded system to facilitate the graphics processor 23 displaying text with the bitmap font data by copying bitmap font data to the memory 25.

In this embodiment, bitmap data is generated according to all vector characters and stored in the memory during system startup. The flowchart can be repeated to generate font with various font sizes when required. Although during the time the second CPU 22 generating bitmap font data, the first CPU 21 resumes the startup procedure, converting the whole vector font file to the bitmap font data may require more system startup time.

Figure 4:
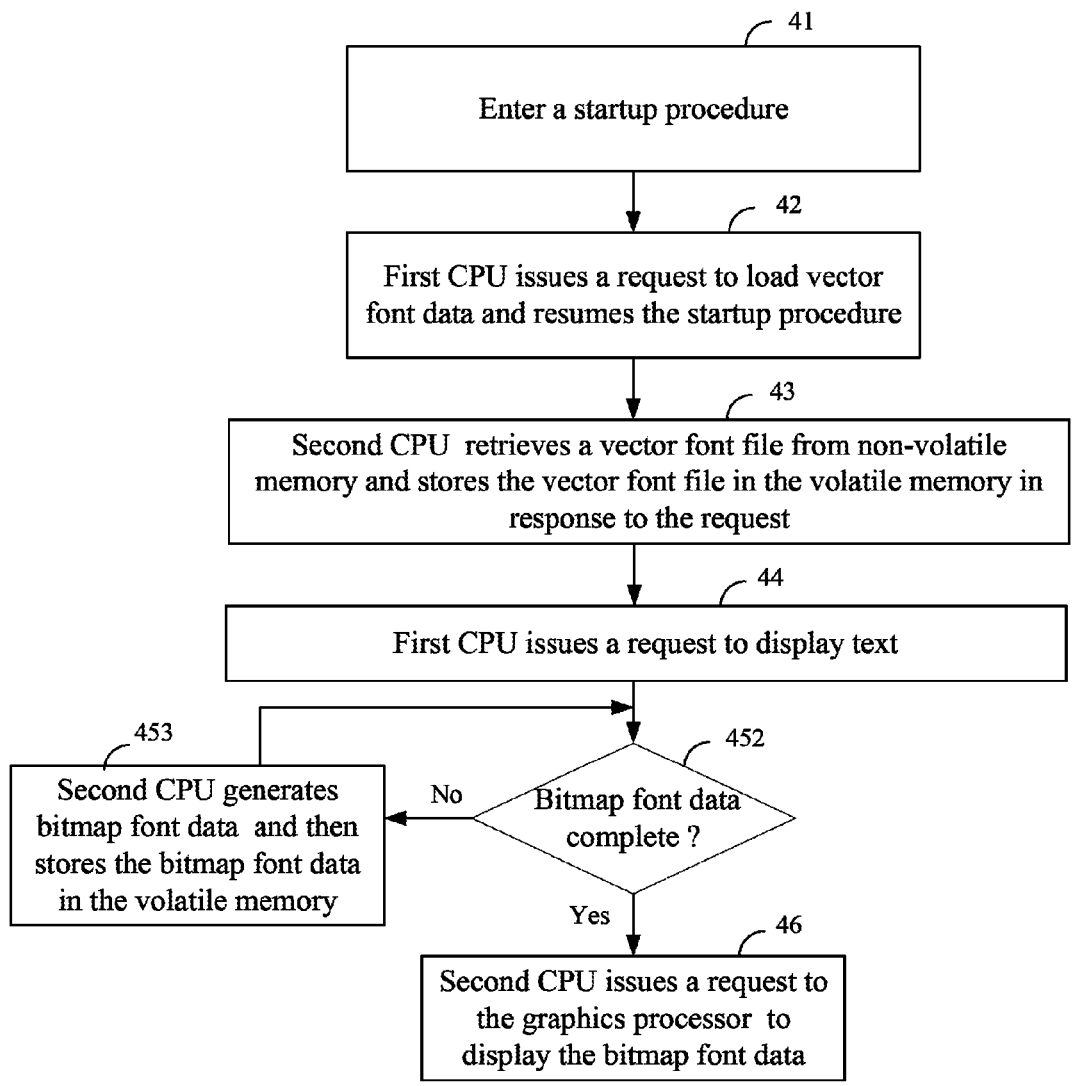
FIG. 4 is a schematic flow chart of the method according to a preferred embodiment of the present invention.

FIG. 4 shows a flow chart of a font data processing method according to a preferred embodiment of the present invention. With reference to the hardware in the FIG. 2, firstly, the system enters a startup procedure at step 41. Then the first CPU 21 issues a request to load vector font data and resumes the startup procedure at step 42. In response to the request to load vector font data, the second CPU 22 retrieves a vector font file from non-volatile memory and stores vector font file in the volatile memory 25 at step 43. At step 44, the first CPU 21 issues a request to display text; for example, the request is to display font in Arial with font size of 32 and the content as "Welcome", then the first CPU 21 continues other computing procedures. At step 451, in response to the request to display text, the second CPU 22 computes on the vector font file to generate bitmap font data corresponding to the requested display text. At step 452, determine if the computing is completed. If not, proceed to step 453, generate bitmap font data corresponding to the requested display text and store the bitmap font data in the volatile memory 25. If yes, proceed to step 46, when bitmap font data is generated and stored, the second CPU 22 issues a request to the graphics processor 23 to display the bitmap font data.

In this embodiment, the first CPU 21 issues requests to the second CPU 22 to proceed to least necessary initialization of vector font during system startup. The vector font file is retrieved from the non-volatile memory 24 and stored in volatile memory 25. When the system needs display text, the first CPU 21 issues a request to the second CPU 22. Upon receiving the request from the first CPU 21 to display content text on the screen, the second CPU 22 generates bitmap data from the vector font file, then sends a request to the graphics processor 23 to display the bitmap data on screen.

To sum up the above, in order to attain the goal of the present invention, the present invention utilizes the characteristics of vector font to effectively save the memory storage space and utilizes at least two processors to speed up the data processing. The first embodiment requires longer system startup time and memory space to store bitmap font data, it has the advantage of shorter time required to display text. The second embodiment is more flexible in saving the memory storage space for bitmap font data and reducing startup time by avoid generating all characters during system startup. The aforementioned embedded system can be a mobile phone or any device with an electronic display function. The request to generate font data, the finish notice, the request to load vector font data and the request to display text can be implemented by interrupt signals or polling. For example, the request to generate font data, the request to load vector font data, or the request to display text generated by the first CPU 21 can be saved in a register (not shown). The second CPU 22 retrieves register by polling and proceeds to corresponding operation in response to the request to form font data, the request to load vector font data and the request to display text. Alternatively, the finish notice generated by the second CPU 22 can be stored in the register (not shown). The first CPU 21 retrieves the register via polling in response to the finish notice and proceeds to corresponding operation. The non-volatile memory 24 and the volatile memory 25 can be a flash memory, a DRAM, and any digital storage medium respectively.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all modifications and similar structures.

What is claimed is:

1. A method for processing font data for an embedded system, been a television system or a mobile cell phone, having on screen display function, said embedded system comprising a first processor, a second processor, a graphics processor, a non-volatile memory and a volatile memory, the method for processing font data comprising:

issuing a request from the first processor to the second processor for generating font data from a vector-based font file;

converting vector-based font data stored in the non-volatile memory into bit-based font data by the second processor wherein the bit-based font data are stored in the volatile memory;

generating a finish notice by the second processor after the vector-based font data are converted into the bit-based font data; and activating said on screen display function of said embedded system by the first processor in response to said finish notice.

2. The method for processing font data of claim 1, wherein said first processor is an 8051 micro controller, and said second processor is a RISC (reduced instruction set computer) CPU.

3. The method for processing font data of claim 1, wherein said request to generate font data issued by said first processor is an interrupt signal, said second processor receives the interrupt signal to generate font data, said second processor retrieves said vector-based font file from said non-volatile memory and computes to generate said bit-based font data and store said bit-based font data in said volatile memory.

4. The method for processing font data of claim 1, wherein said finish notice is an interrupt signal, and, responding to the interrupt signal, said first processor activates on screen display function of said embedded system to facilitate a graphics processor displaying text with said bit-based font data.

5. The method for processing font data of claim 1, wherein said request to generate font data issued by said first processor is stored in a first register, said second processor retrieves said first register by polling data, and further responding to said request said second processor retrieves said vector-based font file from said non-volatile memory and generates said bit-based font data, and said second processor stores said bit-based font data in said volatile memory.

6. The method for processing font data of claim 1, wherein said finish notice is stored in a second register, said first processor retrieves said second register by polling data, and further responding to said finish notice said first processor activates said on screen display function of said embedded system to facilitate a graphics processor displaying text with said bit-based font data.

7. A method for processing font data for an embedded system, been a television system or a mobile cell phone, said embedded system having on screen display function, said embedded system comprising a first processor, a second processor, a graphics processor, a non-volatile memory and a volatile memory, the method for processing font data comprising:

issuing a request to load vector-based font data from a vector-based font file by said first processor;

retrieving the vector-based font file from said non-volatile memory and storing said vector-based font file in said volatile memory responding to said request to load vector-based font data by said second processor;

issuing a request to display text then resuming other computing tasks by said first processor; and generating bit-based font data corresponding to said request to display text by computing on said vector-based font file by said second processor for text displaying.

8. The method for processing font data of claim 7, wherein said first processor is an 8051 micro controller, and said second processor is a RISC (reduced instruction set computer) CPU.

9. The method for processing font data of claim 7, wherein said request to load vector-based font data generated by said first processor is an interrupt signal, and, responding to said interrupt signal associated with said request to load vector-based font data, said second processor retrieves said vector-based font file from said non-volatile memory and stores said vector-based font file in said volatile memory.

10. The method for processing font data of claim 7, wherein said request to display text is an interrupt signal, and, responding to said interrupt signal associated with said request to display text, said second processor computes on said vector-based font file to generate bit-based font data in response to said request to display text, to facilitate a graphics processor displaying text with said bit-based font data.

11. The method for processing font data of claim 7, wherein said request to load vector-based font data generated by said first processor is stored in a first register, said second processor retrieves said first register by polling data, and further responding to said request to load vector-based font data said second processor retrieves said vector-based font file from said non-volatile memory and stores said vector-based font file in said volatile memory.

12. The method for processing font data of claim 7, wherein said request to display text is stored in a second register, said second processor retrieves said second register by polling data, and further responding to said request to display text said second processor computes on said vector-based font file and generates bit-based font data in response to said request to display text to facilitate a graphics processor displaying text with said bit-based font data.

* * * * *